United States Patent
Sanchez et al.

(10) Patent No.: US 6,822,065 B1
(45) Date of Patent: Nov. 23, 2004

(54) SOLID POLYMER ELECTROLYTE AND PREPARATION METHODS

(75) Inventors: Jean Yves Sanchez, Saint Ismier (FR); Fanny Alloin, Grenoble (FR)

(73) Assignee: Institut National Polytechnique de Grenoble, Grenoble Cedex (FR)

( * ) Notice: Subject to any disclaimer, the term of this patent is extended or adjusted under 35 U.S.C. 154(b) by 0 days.

(21) Appl. No.: 09/508,378

(22) PCT Filed: Jul. 9, 1999

(86) PCT No.: PCT/FR99/01680
§ 371 (c)(1),
(2), (4) Date: Jun. 2, 2000

(87) PCT Pub. No.: WO00/03449
PCT Pub. Date: Jan. 20, 2000

(30) Foreign Application Priority Data
Jul. 10, 1998 (FR) ............................................ 98 09385

(51) Int. Cl.$^7$ ........................ C08F 220/12; C08F 220/18
(52) U.S. Cl. .................... 526/329.3; 429/199; 429/206; 429/213
(58) Field of Search ................................ 429/199, 206, 429/213; 526/329.3, 341, 342

(56) References Cited

U.S. PATENT DOCUMENTS

| | | | | |
|---|---|---|---|---|
| 3,770,604 A | * | 11/1973 | Seiner | 204/486 |
| 3,873,493 A | * | 3/1975 | Labana et al. | 523/400 |
| 3,931,123 A | * | 1/1976 | Vacik et al. | 526/320 |
| 3,975,456 A | * | 8/1976 | Labana et al. | 525/186 |
| 4,187,353 A | * | 2/1980 | Schroeder | 521/149 |
| 5,219,679 A | | 6/1993 | Abraham et al. | |
| 5,258,234 A | * | 11/1993 | Ide et al. | 428/500 |
| 5,523,180 A | | 6/1996 | Armand et al. | |
| 5,755,985 A | | 5/1998 | Vallee et al. | |
| 5,800,914 A | * | 9/1998 | Shiokawa et al. | 428/323 |
| 6,019,802 A | * | 2/2000 | Ishizuka et al. | 29/623.5 |
| 6,287,723 B1 | * | 9/2001 | Maeda et al. | 429/206 |

FOREIGN PATENT DOCUMENTS

| | | |
|---|---|---|
| EP | 0 798 791 A | 10/1997 |
| EP | 0 803 925 A | 10/1997 |
| EP | 0 838 873 A | 4/1998 |
| FR | 2 632 455 A | 12/1989 |
| JP | 62-219469 | * 9/1987 |
| WO | WO 95/02314 | 1/1995 |

OTHER PUBLICATIONS

Chemical Abstracts, vol. 108, No. 8, Abstract No. 59469, XP 002122197.
Chemical Abstracts, vol. 128, No. 10, Abstract No. 117388, XP 002122198.
Ouillon et al., Macromol. Chem. Phys. 198, 3425–3439 (1997).

* cited by examiner

*Primary Examiner*—Tatyana Zalukaeva
(74) *Attorney, Agent, or Firm*—Burns, Doane, Swecker & Mathis, L.L.P.

(57) ABSTRACT

The invention concerns a solid polymer electrolyte characterized in that it comprises at least a methacrylonitrile polymer in the form: of a linear homopolymer with strong mass, reinforced or not; or a homopolymer, reinforced or not made three-dimensional by crosslinking; or a linear copolymer with strong mass or made three-dimensional by crosslinking, in particular by incorporation of at least a crosslinkable comonomer. The invention is useful for making electrochemical generators, high load capacitors or electrochrome systems.

10 Claims, No Drawings

SOLID POLYMER ELECTROLYTE AND PREPARATION METHODS

BACKGROUND OF THE INVENTION

1. Field of the Invention

The technical field of the invention is that of solid polymer electrolytes.

Such electrolytes are used in various electrochemical systems, in particular in rechargeable or non-rechargeable lithium electrochemical generators, but also in electrochromic systems or in super-capacitors.

They can also be used for the production of the composite electrodes of a generator.

2. Description of the Related Art

Lithium is increasingly used in batteries because of the redox potential of the Li/Li$^+$ couple, which is situated −3 volts with respect to the standard hydrogen electrode and which allows it to be used for high voltage generators. Furthermore, its high specific capacity allows it to be used for generators with a high specific energy. Lithium can be used in the metallic form in rechargeable or non-rechargeable generators with a negative lithium electrode and in the ionic form in generators with a negative lithiated carbon electrode, better known under the name of lithium ion batteries.

The use of solid polymer electrolytes for lithium batteries has been proposed for a long time. This is because such electrolytes make it possible to produce, with simple preparation processes, thin batteries of varied shapes. The known electrolytes are composed either of a salt dissolved in a dry polymer or of a polymer swollen or gelled by a solution of a salt in a mixture of polar aprotic organic solvents.

The known polymer matrixes can be produced based on thermoplastic materials, such as PVC (polyfvinyl chloride)), PAN (polyacrylonitrile) or PVDF (poly(vinylidene fluoride)). In the absence of solvents (or plasticizers), the mixtures between these thermoplastics and the salts form insulators or very poor ionic conductors.

After addition of solvents, they become sufficiently conducting at ambient temperatures or at temperatures below ambient temperature.

However, PVC is unstable in basic medium and cannot therefore be used in combination with lithium metal or with a lithium ion system.

Likewise, the fluorine atoms of PVDF are reactive with respect to metallic lithium. Furthermore, it should be noted that the CH$_2$—CF$_2$ repeat unit of PVDF has no particular affinity with lithium salts (weak solvating nature for the Li$^+$ cation), which compromises its electrochemical performance.

From the viewpoint of the preparation processes, solvents with low boiling points (<70° C.) which make possible the preparation of stable solutions are not known for PVDF, which complicates the industrial processing.

PVCs and PVDFs are disclosed in particular by Patent EP 803,925.

PAN, which corresponds to the general formula —[CH$_2$—CH (CN)]$_n$, is an industrial polymer used as textile fiber or as precursor for carbon fibers. It comprises a nitrile group (CN) which provides good interaction with the lithium cation (Li$^+$). This polymer is disclosed in particular by Patents WO 95/02314 and U.S. Pat. No. 5,219,679 and partially by EP 803,925. However, this polymer has disadvantages.

Thus, when it is used in combination with a metallic lithium electrode, the interfacial resistance between lithium and electrolyte steadily increases with contact time.

This disadvantage is partly related to the presence, in the repeat unit, of a hydrogen carried by the tertiary carbon which is situated in the a position with respect to the nitrile group (CN). The highly electron-withdrawing effect of this nitrile group renders this hydrogen markedly more acidic. The result of this is amodification over time in the performance of the generator. The interfacial resistance gradually increases, which affects the performance of the battery, in particular the power delivered. Furthermore, thermal degradation of the PAN is reflected by the release of hydrocyanic acid (HCN), which is harmful from the viewpoint of safety of use, in particular for use by the general public.

Finally, from the process viewpoint, PAN is not soluble in solvents with low boiling points. The most commonly used solvent for PAN is DMF or dimethylformamide, the boiling point of which is 152° C. Such a characteristic excludes certain processes for shaping the polymer electrolyte.

This is because one of the conventional routes for the preparation of polymer electrolytes for lithium batteries consists in dissolving a polymer, a salt and a mixture of constituent solvents of the polymer electrolyte in a common solvent, preferably with a low boiling point, and then, after having cast the mixture in the form of a film, in driving off the common solvent at atmospheric pressure or under reduced pressure without removing the constituent solvents of the plasticized polymer electrolyte. The use of a common solvent such as DMF excludes a preparation process incorporating solvents with boiling points lower than that of DMF. In other processes, the PAN+ salt mixture is dissolved under warm conditions in a mixture of cyclic carbonates, before being cast in order to produce a polymer electrolyte membrane. Dissolution is carried out at an excessively high temperature which excludes, for example, the use of non-cyclic carbonates.

SUMMARY OF THE INVENTION

The aim of the invention is to provide a solid polymer electrolyte which does not exhibit such disadvantages. A polymer electrolyte according to the invention is less reactive with respect to lithium than PVDF. It is more stable from the electrochemical viewpoint than PAN and less toxic than the latter from the viewpoint of the emission of hydrocyanic acid (HCN) following thermal degradation. Furthermore, the preparation of the polymer electrolyte according to the invention is simpler because, unlike PVDF and PAN, the polymer which it employs is soluble in many conventional solvents with low boiling points, such as acetone.

The solid polymer electrolyte according to the invention comprises a polymer and a salt, which may or may not be attached to the polymer, and it is characterized in that the polymer is a methacrylonitrile polymer in the form:

of a linear homopolymer of high mass, which may or may not be reinforced, or of a homopolymer, which may or may not be reinforced, rendered three-dimensional by crosslinking, or of a linear copolymer of high mass or of a copolymer rendered three-dimensional by crosslinking, by virtue in particular of the incorporation of at least one comonomer which makes crosslinking possible.

An electrolyte of the invention can optionally comprise, in addition, at least one aprotic liquid solvent (which will generally have a plasticizing effect) and optionally a filler.

DETAILED DESCRIPTION OF THE PREFERRED EMBODIMENTS

In the continuation of the text, a meth-acrylonitrile polymer as defined above generally is denoted by "MANP", polymethacrylonitrile (homopolymer) is denoted by "MANHP", methacrylonitrile is denoted by "MAN", a copolymer of MAN and of a comonomer is denoted by "MANCOP", propylene carbonate is denoted by "PC" and ethylene carbonate is denoted by "EC".

Methacrylonitrile is commercially available.

Patent EP 803,925 cites the polymer MANHP but as a simple alternative to PVC and to PVDF, and from about fifteen other polymers, to be used as separator in the presence of liquid solutions of salts in organic solvents.

However, this document does not cite any example of the preparation of MANP and it is silent on the advantages which an MANP can exhibit with respect to other polymers.

In fact, it is not possible to make direct use of any methacrylonitrile polymer in preparing a solid polymer electrolyte. This is because the solvents generally used to prepare the electrolytes (such as propylene or ethylene carbonate, which make it possible to increase the conductivity and incorporate the lithium salt) dissolve the MANP and have a strong detrimental effect on its mechanical properties.

The MANP can be a linear homopolymer MANHP having a molar mass of greater than $8 \times 10^5$ g/mol, preferably of greater than or equal to $10^6$ g/mol, optionally strengthened by a filler, for example silica.

The MANP can be a homopolymer MANHP which has been completely or partially crosslinked, for example by exposure to ultraviolet radiation or by electron bombardment.

When the MANP is a homopolymer, it can comprise from 5% to 20% by mass of silica as filler.

The MANP can be a copolymer MANCOP of methacrylonitrile and of a comonomer, the said copolymer being a linear copolymer having a high molar mass or a crosslinked three-dimensional copolymer of MAN and of a comonomer which makes possible crosslinking.

The use of an MANP as defined above makes it possible to obtain a polymer electrolyte exhibiting the desired qualities (nontoxicity, improved electro-chemical stability, ease of industrial manufacture) while having mechanical characteristics appropriate for a practical use. It is thus possible to produce polymer electrolyte films with a thickness of a few tens of micrometers which incorporate metal salts (for example, lithium salts) and which can be wound and/or can adopt various shapes.

As regards the toxicity, the degradation of PAN was studied by I. Ouillon et al. (Macromol. Chem. Phys., 198, 3425–39, 1997). These authors show that the thermal degradation of PAN is reflected essentially by losses of ammonia and of hydrocyanic acid and cyclization reactions. They also studied MANHP and found that the decomposition of the latter is reflected essentially by depolymerization reactions which release the much less dangerous methacrylonitrile monomer.

In the case of the copolymers MANCOP, the choice is advantageously made of a copolymer of MAN and of at least one comonomer which makes possible the use of solvents with low boiling points while reducing the solubility in propylene carbonate or ethylene carbonate and/or of at least one comonomer which makes possible internal plasticization of the polymer by decreasing its glass transition temperature and/or of at least one comonomer which makes possible the introduction of an ionic functional group in order to obtain a unipolar electrolyte.

Such choices make it possible to obtain an electrolyte:

the industrial use of which is rendered easier, the comonomer making possible the use of solvents with low boiling points;

the flexibility of which is improved, the comonomer making possible internal plasticization, the electrochemical behavior of which is better because of the improvement in the polymer solvent interaction when the comonomer has an ionic functional group.

Mention may in particular be made, among the preferred copolymers MANCOP, of copolymers with a random tendency prepared by the radical route. They comprise one or more acrylic or methacrylic monomers. The choice of these polymers is due to reasons of copolymerization reaction kinetics, the reactivity ratios of MAN to acrylates or methacrylates being favorable to the preparation of the copolymers.

It is thus possible to use acrylic or methacrylic comonomers which make possible internal plasticization of the polymer, the effect of which is to decrease the glass transition temperature (Tg) of the copolymer with respect to that of the homopolymer MANHP (thus to increase the flexibility of the polymer). This is because the semi-empirical Fox relationship makes it possible for a person skilled in art to predict the Tg of a copolymer in which two monomer units A and B are combined randomly according to $1/Tg_{AB}=W_A/Tg_A+W_B/Tg_B$, in which relationship $Tg_A$ and $Tg_B$ respectively represent the glass transition temperatures of the homopolymers poly(A) and poly(B) while $W_A$ and $W_B$ represent the fractions by mass of the two monomer units incorporated in the copolymer.

Thus, if the comonomer A added to methacrylonitrile (monomer B) is butyl acrylate, the $Tg_A$ of the homopolymer poly(butyl acrylate) is 219 kelvin (−54° C.). As it is known that the $Tg_B$ of MANHP is 393 Kelvin (120° C.), the glass transition temperature of a copolymer of these two monomers in which $W_A$ would represent 0.2 and $W_B$ 0.8 can be predicted by calculating the expression: $1/Tg_{AB}=0.2/219+0.8/393$. A value for $Tg_{AB}$ of 339 K or 66° C. should therefore be found. The incorporation of butyl acrylate therefore makes possible internal plasticization, even if the result in practice is different from the theoretical prediction.

For this reason, recourse to such a plasticizing comonomer makes it possible to decrease the amount of solvents added and thus to simplify the process for preparing the electrolyte and to decrease its cost, one of the functions of the added solvents being to cause so-called external plasticization in order to lower the glass transition temperature of the polymer electrolyte.

Use may be made of acrylic or methacrylic comonomers not only to produce internal plasticization (as described hereinabove) but additionally to improve the solvating properties and/or the interaction with the constituent solvents and the constituent salt of the polymer electrolyte. They are then, for example, methacrylic macromonomers corresponding to the formula $CHX=CZ—CO—V—Y$ in which $X=H$, $Z=CH_3$, $V=O$ and $Y=[(CH_2)_m—O]_pR'$, with $m=2$, $R'=H$ or $CH_3$ and $1 \leq p \leq 22$. The poly(ethylene glycol) methacrylate sold by the company Aldrich under the reference 40,953,7 can in particular be chosen.

Use may also be made of acrylic or methacrylic comonomers with the aim of allowing subsequent crosslinking of the copolymer by polycondensation. These monomers can have an alcohol functional group which can be crosslinked by diisocyanate compounds, such as tonecocyanate (hereinafter denoted by "TDI") or hexamethylene diisocyanate (hereinafter denoted by "HMDI"). One alternative consists in introducing an isocyanate functional group into the copolymer by using methacryloyl isocyanate as comonomer. The isocyanate functional group incorporated can be condensed with alcohol functional groups to give an urethane or with an amine to give an urea functional group. For this reason, the copolymer comprising an isocyanate functional group can be crosslinked by polycondensation with a polyol (crosslinking via a urethane bond), generally a diol or a triol, or a polyamine (crosslinking via a urea bond). A diamine or a triamine will be used, for example. If the comonomer chosen is a methacrylate comprising a trialkoxysilyl functional group, such as (trimethoxysilyl)propyl methacrylate, the crosslinking can be carried out subsequently by hydrolysis/condensation of the methoxysilyl functional groups in the presence or absence of other polyalkoxysilanes. This process is conventional and is known under the term of sol-gel process. The crosslinking is carried out here via a siloxane bond which is more flexible than the urethane or urea bonds. The term "polyalkoxy" is understood to mean di-, tri- or tetraalkoxy.

Use may be made of acrylic or methacrylic comonomers which make possible subsequent crosslinking of the material by cationic polymerization. Such comonomers have an oxirane functional group which does not polymerize by the radical route, as in glycidyl acrylate and methacrylate. After formation of the copolymer, the product can be photo-crosslinked by cationic photoinitiation.

Finally, it is possible to provide for at least one comonomer which makes possible the introduction of an ionic functional group in order to obtain a unipolar electrolyte. Such a characteristic makes it possible to have an immobilized anion (or cation) as it is bonded to the polymer, the conductivity then being provided only by the other ion of the electrolyte.

In a specific embodiment, the polymer MANP is a polymer of MAN and of at least one acrylic comonomer corresponding to the formula $CHX=CZ—CO—V—Y$ in which:

$X=C_nH_{2n+1}$, $0 \leq n \leq 8$, preferably $n=0$;

$Z=C_nH_{2n+1}$, $0 \leq n \leq 8$ (preferably $n=0$ or 1), or $Z=(CH_2)_m CN$, with $0 \leq m \leq 4$, $V=O$, $NH$ or $NR$ with $R=C_nH_{2n+1}$, $0 \leq n \leq 8$ (preferably $0 \leq n \leq 4$);

$Y=C_nH_{2n+1}$, with $0 \leq n \leq 8$, $C_nH_{2n}$-$(CH—CH_2)$—$O$ (oxirane functional group with $0 \leq n \leq 4$) or $[(CH_2)_m—O—]_pR'$ with $m=2$, 3 or 4 (preferably $m=2$), $0 \leq p \leq 50$ (preferably between 2 and 22) and $R'=C_nH_{2n+1}$ with $0 \leq n \leq 5$ 8 (preferably $n=0$, 1 or 2).

According to the choice of the various parameters, it is possible to prepare a copolymer of MAN and of at least one alkylenebisacrylamide comonomer ($V=NH$, $X=H$, $Z=H$, $Y(CH_2)_n$—$NH$—$CO$—$CH=CH_2$, ($n=1$ to 6), such as methylenebisacrylamide or hexamethylenebisacrylamide, or of at least one alkylene diacrylate or dimethacrylate comonomer or poly(ethylene glycol) diacrylate or dimethacrylate comonomer.

It is also possible to prepare a copolymer of MAN and of at least one poly(ethylene glycol) methylether methacrylate (PEGMM) comonomer (i.e. $V=O$, $X=H$, $Z=CH_3$ and $Y=[(CH_2)_m—O—]_pR'$ with $m=2$ and $R'=CH_3$).

It is also possible to prepare a copolymer of MAN and of at least one hydroxyalkyl acrylate comonomer (i.e., $X=H$, $Z=H$, $V=O$ and $Y=[(CH_2)_m—O—]_pR'$ with $p=1$, $R'=H$ and $1 \leq m \leq 8$ or hydroxyalkyl methacrylate comonomer (i.e., $X=H$, $Z=CH_3$, $V=O$ and $Y=[(CH_2)_m—O—]_pR'$ with $p=1$, $R'=H$ and $1 \leq m \leq 8$).

The comonomer can be chosen more particularly from:

hydroxyethyl acrylate and hydroxyethyl methacrylate ($m=2$), hydroxypropyl acrylate and hydroxypropyl methacrylate ($m=3$), hydroxybutyl acrylate and hydroxybutyl methacrylate ($m=4$).

An electrolyte can advantageously be prepared comprising at least one terpolymer of methacrylonitrile (MAN), of poly(ethylene glycol) methylether methacrylate (hereinafter denoted by "PEGMM") and of hydroxyethyl methacrylate (hereinafter denoted by "HEMA") in respective molar proportions x, y and z such that $40\%<x<97\%$, $1\%<y<40\%$ and $1\%<z<20\%$, preferably $85\%<x<90\%$, $1\%<y<7\%$ and $2\%<z<8\%$.

It is also possible to prepare a solid polymer electrolyte comprising at least one terpolymer of MAN, of octyl methacrylate and of HEMA in the respective molar proportions x, y and z such that $60\%<x<97\%$, $1\%<y<30\%$ and $1\%<z<15\%$, preferably $80\%<x<95\%$, $1\%<y<10\%$ and $2\%<z<10\%$.

It is also possible to prepare a solid polymer electrolyte comprising at least one terpolymer of MAN, of butyl methacrylate and of HEMA in the respective molar proportions x, y and z such that $50\%<x<97\%$, $1\%<y<40\%$ and $1\%<z<15\%$ and preferably $70\%<x<95\%$, $1\%<y<20\%$ and $2\%<z<10\%$.

Finally, it is possible to prepare an electrolyte comprising at least one terpolymer of MAN, of hexyl acrylate ($X=H$, $Z=H$, $V=O$, $Y=C_6H_{13}$) and of HEMA in the respective molar proportions x, y and z such that $60\%<x<97\%$, $1\%<y<30\%$ and $1\%<z<10\%$, preferably $70\%<x<95\%$, $1\%<y<25\%$ and $2\%<z<8\%$.

Use may be made, as an alternative to acrylic comonomers, of vinyl monomers which are copolymerized with MAN and which are chosen, for example, so as to introduce an ionic functional group into the polymer chain. Thus, the anion is attached via a covalent bond to the polymer chain and a polymer electrolyte with cationic unipolar transport is obtained. Use may be made of a lithium styrenesulfonate, a lithium vinylsulfonate, a lithium acrylamidopropanesulfonate or a lithium N,N-diallyl-1-amidotetrafluoroethane-sulfonate. The latter salt, which carries a perfluorosulfonate functional group, is disclosed in particular by Patent FR 2,687,671.

The solid polymer electrolyte can also comprise at least one bipolymer of MAN and of a monomer carrying an ionic functional group of carboxylate, phosphate, phosphonate, sulfonate or perfluorosulfonate type. More specifically, this electrolyte comprises at least one bipolymer of MAN and of a monomer carrying a perfluorosulfonate functional group chosen from lithium N,N-diallyl-1-amidotetrafluoroethanesulfonate $(CH_2=CH-CH_2)_2$ $NCOCF(CF_3)SO_3Li$ and lithium allyloxytetrafluoroethylsulfonate $CH_2=CH-CH_2-O-(CF_2)_2-SO_3Li$.

According to another embodiment of the invention, the solid polymer electrolyte comprises a copolymer of methacrylonitrile and of at least one comonomer comprising an oxirane functional group, such as glycidyl acrylate or glycidyl methacrylate.

According to another embodiment, the solid polymer electrolyte comprises a copolymer of methacrylonitrile and of at least one acryloyl isocyanate or methacryloyl isocyanate comonomer. The molar proportions of comonomer with respect to the MAN are then preferably between 1 and 20%, more particularly between 3 and 10%.

According to another embodiment, the solid polymer electrolyte according to the invention comprises a copolymer of methacrylonitrile and of at least one (trimethoxysilyl) propyl methacrylate comonomer in molar proportions with respect to the MAN preferably of between 1 and 40%, more particularly between 3 and 15%.

According to another embodiment of the invention, the solid polymer electrolyte according to the invention comprises a copolymer of methacrylonitrile and of at least one methacrylate comonomer carrying a cyclic carbonate functional group. This comonomer is preferably used in molar proportions with respect to the MAN of between 1 and 40%, more particularly between 5 and 25%.

According to another embodiment of the invention, the solid polymer electrolyte comprises a copolymer of methacrylonitrile and of at least one comonomer of aromatic olefin type, such as indene, acenaphthylene, vinylnaphthalene, vinylferrocene, vinylpyridine and styrene, which may or may not be substituted. This comonomer is preferably used in molar proportions with respect to the MAN of between 1 and 30%, more particularly between 5 and 15%.

According to another embodiment, the solid polymer electrolyte comprises a copolymer of methacrylonitrile and of at least one comonomer of styrene type substituted on the aromatic ring at the meta or para position with respect to the double bond by substituents R representing $C_nH_{2n+1}$, with $1 \leq n \leq 8$, $CH_3O$, $CH_2Cl$, $CH_2Br$ or $C_nH_{2n+1}-OH$ with $1 \leq n \leq 8$. The molar proportions of the comonomer with respect to the MAN are preferably between 1 and 30%, more particularly between 5 and 20%.

According to another embodiment of the invention, the solid polymer electrolyte comprises a copolymer of methacrylonitrile and of at least one acrylonitrile, cyanoacrylate or cyanomethacrylate comonomer.

According to other embodiments, a polymer electrolyte can be prepared comprising a copolymer of methacrylonitrile and of at least one comonomer chosen from 1,1-dicyanoethene, vinylimidazole, vinyltriazole, vinyltetrazole, vinyl acetate, vinyl chloride, vinyl fluoride, vinylidene chloride, vinylidene fluoride, vinylene carbonate and maleic anhydride.

Mention may be made, among preferred copolymers, of so-called "block" MAN copolymers. Conventionally, in block copolymers, either the combined physicochemical properties of the various blocks (when the blocks are immiscible with one another) or intermediate properties are obtained. Although some block copolymerizations can be carried out by the cationic route and, possibly, by the radical route, anionic polymerization remains unquestionably the synthetic route which is the best suited to the preparation of block copolymers. However, it requires so-called "living" polymerizations (quantitative and rapid initiation before propagation, no transfer or termination reactions). PVC and PVDF cannot be prepared by the anionic route because the halogens react with the very strong bases used in anionic polymerization. PAN can be prepared by the anionic route but its polymerization is not living. On the other hand, the anionic polymerization of MAN is a living polymerization. It is known that the anionic polymerization of ethylene oxide is a living polymerization. MANHP blocks are therefore advantageously combined with more flexible poly (oxyethylene) (POE) blocks, which contribute flexibility to the material and the ability to solvate lithium salts. Whereas the order of addition of the various blocks must be carried out in anionic polymerization in the direction of the increasing electron affinities of the two monomers, copolymers comprising MANHP-POE blocks can surprisingly be prepared in both directions of addition.

Thus, the solid polymer electrolyte according to the invention can comprise at least one diblock or triblock copolymer which combines at least one polymethacrylonitrile sequence with at least one polyether sequence. More particularly, the solid polymer electrolyte according to the invention can comprise at least one poly(oxyethylene)-block-polymethacrylonitrile (POE-b-MANHP) diblock copolymer.

According to another embodiment, the polymer electrolyte according to the invention comprises at least one poly(oxyethylene)-block-polymethacrylonitrile-block-poly (oxyethylene) triblock copolymer.

According to another embodiment, the solid polymer electrolyte according to the invention comprises at least one polymethacrylonitrile-block-polyether-block-polymethacrylonitrile triblock copolymer in which the central polyether sequence is a poly(oxyethylene), a poly (oxypropylene), a poly(oxytri-methylene), a poly (oxytetramethylene), a poly(oxyethylene-oxymethylene) or an α,ω-diamino polyether.

To prepare a polymer electrolyte according to the invention, at least one solvent and at least one salt are incorporated in one of the polymers MANP described above.

The solvent is chosen from propylene carbonate (PC), ethylene carbonate (EC), γ-butyrolactone, dimethoxyethane or a dialkyl carbonate. The salt is a metal salt, in particular a lithium salt chosen from lithium halides LiX (X=Cl, Br, I or $I_3$), lithium perfluorosulfonate ($C_nF_{2n}SO_3Li$) lithium (trifluoromethylsulfonyl)imide ($N(CF_3SO_2)_2$) Li, lithium bis(trifluoromethylsulfonyl)methide ($HC(CF_3SO_2)_2$)Li, lithium tris(trifluoromethyl-sulfonyl)methide ($C(CF_3SO_2)_3$) Li, lithium perchlorate ($LiClO_4$), lithium hexafluoroarsenate ($LiAsF_6$), lithium hexafluorophosphate ($LiPF_6$), lithium hexafluoroantimonate ($LiSbF_6$) and lithium tetrafluoroborate ($LiBF_4$).

Another subject-matter of the invention is the processes for the preparation of such polymer electrolytes.

In one embodiment, an electrolyte according to the invention is prepared by dissolving the MANP and the salt in a solvent with a low boiling point (for example, in acetone), by casting the solution onto an appropriate substrate and by then removing the solvent. In addition, it is possible to introduce, into the solution, one or more additional solvents having a higher boiling point which act as plasticizers (for example, EC or PC); and/or a filler, such as silica, of use in particular when the MANP is a non-crosslinked homopolymer; and a crosslinking agent, when the comonomer of the MANP carries groups capable of crosslinking. When the polymer is a MANCOP obtained from a comonomer carrying ionic groups, it is not essential to dissolve a salt in the solvent.

In another embodiment, an electrolyte is prepared analogously but using only solvents, such as EC or PC, which act as plasticizers.

It is also possible to prepare an electrolyte by a process which consists in dissolving the polymer and optionally a crosslinking agent and/or fillers in acetone, in then casting the solution obtained onto an appropriate substrate, in removing the acetone, in crosslinking the film and in then incorporating therein a solution of the salt in a solvent.

In another embodiment, a dry mixture of the various constituents of the electrolyte, namely the MANP, the salt and/or the plasticizing solvents and/or a crosslinking agent, is prepared, the mixture is then extruded, for example through a flat die, and the film obtained is crosslinked.

In another alternative form, the electrolyte can be obtained in the form of a microporous membrane, for example by a phase inversion process. The MANP is dissolved in a mixture composed of a good solvent (for example, acetone) and of a non-solvent compound (for example, hexane), the non-solvent having a higher boiling point than that of the solvent. The solution obtained is subsequently cast onto an appropriate substrate and the solvent having the lowest boiling point is evaporated. After completely removing this solvent, the MANP precipitates from the non-solvent compound and forms a microporous membrane. In another embodiment, a microporous membrane can be obtained from a solution of MANP in a solvent (for example, acetone or THF) which is cast onto an appropriate substrate, the film on the substrate thus obtained subsequently being immersed in a non-solvent compound (for example, hexane) in order to bring about the precipitation of the MANP in the form a microporous membrane. In both cases, the microporous membrane can subsequently be impregnated with a liquid electrolyte comprising the salt and/or solvents and/or a filler and/or a crosslinking agent. This liquid electrolyte fills the micropores of the membrane and can partially swell the MANP.

An electrolyte of the present invention can be used as electrolyte in a lithium electrochemical generator, in a supercapacitor or in an electrochromic system.

A process for the bulk preparation of a methacrylonitrile homopolymer by the radical route comprises the following stages:

a thermal-decomposition free-radical initiator is dissolved in MAN, the mixture is degassed in order to remove the oxygen and is introduced into a hermetically closed chamber, the mixture is brought to a temperature of 60 to 90° C. and is maintained at this temperature for 24 to 72 hours.

The initiator can advantageously be chosen from azobisisobutyronitrile (AIBN), benzoyl peroxide and potassium persulfate.

In a process for the preparation of a methacrylonitrile block copolymer, the polymerization of the polymethacrylonitrile block or blocks can be carried out by monofunctional, difunctional or tri-functional anionic initiation from a poly(oxyethylene) block terminated by one, two or three alkoxide groups.

According to another embodiment, the poly(oxyethylene) block or blocks are obtained by mono-or ditunctional anionic initiation of the polymerization of ethylene oxide from a living anionic polymethacrylonitrile chain.

The processes for the preparation of a methacrylonitrile homopolymer or copolymer can comprise a crosslinking stage after the polymerization stages. The crosslinking can be carried out by irradiation or by electron bombardment, after incorporation of a photoinitiator and optionally of a monomer with a functionality of 2 or 4 in a solution of MANHP in a solvent. Alternatively, the crosslinking can be carried out via urethane or siloxane bonds.

It is also possible to obtain a crosslinked or non-crosslinked methacrylonitrile copolymer by a process essentially comprising a stage of photochemical initiation of radical polymerization by irradiation (in particular UV irradiation). Such a process results directly in the production of a thin film of polymer electrolyte.

Alternatively, a methacrylonitrile homopolymer or copolymer can be prepared by radical polymerization according to conventional industrial emulsion or suspension processes.

The invention will be better understood on reading the description which will follow of various examples of the preparation of polymer electrolytes.

EXAMPLE 1

6 ml of MAN (methacrylonitrile), freshly distilled under argon in order to remove oxygen, are introduced into a tube. 3 mg of initiator AIBN (azobisisobutyronitrile) are then dissolved in the MAN, without addition of solvent. The mixture is subsequently degassed in order to remove oxygen and the tube is then hermetically closed and brought to 70° C. for 48 hours.

The following experimental conditions were chosen in order to obtain high molar masses: moderate temperature, purification of the monomer, low amounts of initiator and short reaction time. In this bulk polymerization (that is to say, without solvent other than the monomer MAN), the homopolymer MANHP obtained is insoluble in the monomer MAN and forms a transparent and hard gel. After dissolution in acetone, the reaction mixture is precipitated from pentane.

After washing the precipitate with pentane and drying, a precipitated polymer is obtained with a yield of 30%. The intrinsic viscosity of the polymer was determined in the solvent DMF (dimethylformamide) at 25° C. by using a capillary viscometer with an Ubbelohde tube.

A comparative study carried out between the MANHP thus synthesized and commercial MANHP supplied by the company Aldrich showed that the latter was markedly less viscous than the synthesized polymer. The Mark-Houwink-Sakurada law for MANHP in DMF has made it possible to calculate a viscometric mass $Mv=1.1 \times 10^6$ g/mol, whereas that of the commercial MANHP is $0.45 \times 10^6$ g/mol.

By using the optimum electrolyte compositions (PC/EC/LiClO$_4$) given in the literature, two films were cast with the synthesized MANHP and the commercial MANHP respectively. The film prepared with the commercial MANHP is a viscous liquid which flows, whereas that prepared from the MANHP synthesized according to the above method forms a film which does not flow.

The mechanical properties of the film prepared with the synthesized MANHP can be improved by UV irradiation and/or by the addition of fillers or fibrous reinforcements. It is possible in particular to add, in proportions of 5 to 20% by mass, silica supplied by the company Degussa under the reference FK325. Such an addition makes it possible to improve the mechanical properties of the polymer electrolyte without harming its electrochemical properties.

EXAMPLE 2

3% by mass, with respect to the MANHP, of a photoinitiator, such as Irgacure I 651 (2,2-dimethoxy-1,2-diphenylethane-1-one), are added to a solution in acetone of MANHP as prepared in accordance with Example 1.

After evaporating the acetone, the film is subjected to UV irradiation using a Philips UV lamp of HPA type with metal iodides (iron and cobalt iodides), the intense UV-A emission spectrum of which lies between 350 and 400 nanometers after an exposure time of 25 min. The sample is placed at approximately 8 cm from the UV lamp and cooled by a Peltier-effect system in order to keep its temperature below 50° C.

In fact, and despite the absence of unsaturations, the MANHP partially crosslinks. The level of extractables is then 85% but the behavior with respect to the conventional electrolyte is improved, probably because of branching reactions which increase the molar mass Mw of the non-crosslinked parts.

In an alternative form, 3% by mass of Irgacure I 651 and 50 to 80% by moles of ethylene carbonate as plasticizing solvent are incorporated in the sample of MANHP dissolved in the minimum amount of acetone. Evaporation of the acetone does not result in evaporation of the ethylene carbonate.

EXAMPLE 3

A methylenebisacrylamide (hereinafter denoted by "MBA"), which is a monomer with a functionality of 4, in different proportions, and 3% by weight of Irgacure I 651 with respect to the MANHP are added to a concentrated solution of MANHP in acetone prepared in accordance with Example 1. The film is cast into a substrate.

After evaporating the acetone, the film is subjected to UV exposure with the lamp used in Example 2. The level of insolubles was measured after washing the membrane obtained in a large excess of acetone. The difference between the weight of the membrane before washing and after washing, followed by drying, make it possible to calculate the level of insolubles. Tests were carried out for different % by mass of monomer MBA with respect to the MANHP. The results obtained show that the proportion of insolubles increases with the level of MBA and passes through a maximum for a level of MBA of 30%. However, this level of insolubles already reaches 40% for a level of MBA of only 3%.

EXAMPLE 4

An MAN/glycidyl methacrylate copolymer was prepared. Two syntheses were carried out with the following molar proportions of the monomers: the first with 95% of MAN and 5% of glycidyl methacrylate and the second with 80% of MAN and 20% of glycidyl methacrylate. The copolymerizations, carried out in cyclohexanone, are initiated by AIBN (3 mg of AIBN are used per 6 ml of solution). The synthesis takes place under argon pressure at 70° C. for several days. The copolymers are obtained with a yield in the region of 80%. They exhibit a quasi-statistical distribution of the two comonomers in the macromolecular chains. However, the glycidyl methacrylate has a lower reactivity than that of the MAN and the proportion of the two monomer units in the copolymer is substantially different from that of the starting mixture of monomers. Thus, the copolymers obtained with the starting proportions given hereinabove have the following compositions: 99% MAN and 1% glycidyl methacrylate for the first synthesis, 96% MAN and 4% glycidyl methacrylate for the second. It is therefore necessary, in order to achieve a degree of incorporation of Z % of glycidyl units, to provide for a starting proportion of glycidyl methacrylate approximately equal to 5Z %. The crosslinking of such a copolymer can be carried out by opening with diamines or triamines. In the present example, the crosslinking was obtained by photopolymerization under UV irradiation using diphenyliodonium hexafluoroantimonate [(C$_6$H$_5$)I$^+$ SbF$_6^-$] as cationic photoinitiator. The latter releases, under UV, a Lewis acid which initiates the cationic polymerization of the oxirane rings. A level of insolubles of 63% was obtained for a proportion of 4% by mass of initiator. It is possible to increase this percentage by starting from a copolymer with a higher mass which is richer in glycidyl functional groups.

EXAMPLE 5

An MAN/HEMA copolymer comprising 3 mol % of HEMA and 97% of MAN was synthesized. The percentages of the two monomers in the copolymer were determined by proton NMR using a Brucker 200 MHz Fourier transform spectrometer. The synthesis took place under bulk conditions at 70° C. for 48 h using AIBN as initiator. 3 mg of initiator AIBN were used per 8 ml of mixture of monomers (3% HEMA and 97% MAN). The copolymer obtained is soluble in acetone and was reprecipitated from pentane. The copolymer is also soluble in THF (tetrahydrofuran), which allowed it to be characterized by gel permeation chromatography using a set of ultrastyragel columns with porosities of 500, $10^3$, $10^4$ and $10^5$ Angotröms, calibrated with a standard set of polystyrene samples. Molar mol masses Mw in the region of $10^5$ g/mole, calculated as polystyrene equivalent, were obtained. Crosslinking via a urethane bond was carried out by using toluene diisocyanate (TDI) or hexamethylene diisocyanate (HMDI) as initiator. The TDI and the HMDI are used in a stoichiometric proportion with respect to the alcohol functional groups of the HEMA unit (number of OH functional groups of the HEMA equal to the number of NCO functional groups of TDI or HMDI, that is to say NCO/OH=1). Dibutyltin dilaurate is used as catalyst in a proportion of 5 mol % with respect to the number of moles of NCO functional group. The copolymer, the diisocyanate and the catalyst are dissolved in concentrated solution in acetone or THF. After degassing in order to remove air bubbles, the product is cast into a substrate, the solvent (acetone or THF) is evaporated and the reaction is allowed to continue for 48 hours at 30° C. in a glove box maintained under dry argon.

Levels of insolubles in the region of 90% were obtained with both types of initiator. Surprisingly, crosslinking results in a decrease in the glass transition temperature by 30° C. and 40° C. respectively, according to whether TDI or HMDI is used. Crosslinking therefore exerts an internal plasticizing effect which makes it possible to obtain a more flexible membrane.

The MAN/HEMA copolymer could be crosslinked by treating the alcohol functional groups of the HEMA units with triethoxy(isocyanatopropyl)silane, sold by Aldrich under the reference 41,336,4. By using a 1/1 stoichiometry between the OH functional groups of the HEMA and the isocyanate functional groups of the silane, it is possible to condense the silane with the copolymer while using the same percentage of catalyst as with TDI or HMDI. The reaction product remains soluble in the reaction solvent and the functional groups can be hydrolyzed according to the conventional sol-gel mechanism (0.5 mol of water per mole of ethoxysilane functional group) to form a network with a siloxane bond. The hydrolysis/condensation reaction of the ethoxysilane bonds should preferably be carried out after having cast the film.

EXAMPLE 6

Copolymers of MAN and of a poly(ethylene glycol) methylether methacrylate which has a molar mass Mn=400 g/mol and which is denoted by PEGMM 400 were synthesized, said copolymers comprising different percentages of PEGMM 400. The two monomers were mixed in the following molar proportions: for the first synthesis, 4% of PEGMM and 96% of MAN; for the second synthesis, 8% of PEGMM and 92% of MAN. 3 mg of AIBN were incorporated per 6 g of mixture of monomers. Polymerization was carried out under bulk conditions at 70° C. in sealed tube (following the protocol of Example 1). Copolymers comprising 6 mol % and 14 mol % of PEGMM 400 were thus obtained. These copolymers, dissolved in acetone, are reprecipitated from pentane. Masses in the region of $10^5$ g/mol were obtained

EXAMPLE 7

An MAN/PEGMM/HEMA (hydroxyethyl methacrylate) terpolymer comprising 2.5 mol % of PEGMM 400 and 5 mol % of HEMA were synthesized according to the same synthetic method of Example 6.

A terpolymer was obtained which is soluble in acetone. It exhibits a molecular mass of 40,000 g/mol. It was subsequently crosslinked via a urethane bond by using hexamethylene diisocyanate (HMDI), which is a difunctional isocyanate, in the stoichiometric proportion (NCO/OH=1) in the presence of dibutyltin dilaurate as catalyst (5 mol % with respect to the NCO functional groups). A network exhibiting a high level of insolubles (90%) was obtained.

EXAMPLE 8

0.1 mol of methacrylonitrile, 0.018 mol of octyl methacrylate and 0.0062 mol of HEMA were mixed with 2 ml of butanone (solvent) in a sealed tube under argon. Radical polymerization took place at 70° C. using AIBN as initiator. 3 mg of AIBN were incorporated in the mixture of monomers. The copolymer obtained is dissolved in acetone and reprecipitated from pentane. A copolymer with a molar composition 69% MAN/12% HEMA/19% octyl methacrylate was obtained with a yield in the region of 40%. The number-average molecular mass recorded for this polymer is Mn=30,000 g/mol. The octyl methacrylate incorporated acts as internal plasticizer and contributes to a decrease in the glass transition temperature Tg (Tg=82° C.) of approximately 40° C.

This copolymer was crosslinked via urethane bonds by using HMDI as initiator in the stoichiometric proportion (NCO/OH=1) and dibutyltin dilaurate (5 mol % with respect to the NCO functional groups as catalyst. A network having a level of insolubles of 86% was obtained.

EXAMPLE 9

0.1 mol of methacrylonitrile, 0.021 mol of butyl methacrylate and 0.0037 mol of HEMA (hydroxyethyl methacrylate) were introduced into a sealed tube. Polymerization took place under bulk conditions at 70° C. with AIBN as initiator. 3 mg of AIBN were incorporated.

This polymer is soluble in various solvents with low boiling points, such as acetone or tetrahydrofuran.

A copolymer with a molar composition of 52% MAN/9% HEMA/39% butyl methacrylate was also obtained (following a polymerization by the radical route analogous to that described in Example 8) with a yield in the region of 30%. The copolymer obtained exhibits a number-average molecular mass of 70,000 g/mol and a glass transition temperature of 80° C.

This copolymer was crosslinked via urethane bonds by using HMDI as initiator in the stoichiometric proportion (NCO/OH=1) and dibutyltin dilaurate (5 mol % with respect to the NCO functional groups as catalyst. A network having a level of insoluble of 85% was obtained.

EXAMPLE 10

0.1 mol of MAN, 0.021 mol of hexyl acrylate and 0.0037 mol of HEMA were mixed. Polymerization took place under bulk conditions at 70° C. in a sealed tube with AIBN as initiator. 3 mg of AIBN were incorporated. A copolymer with the molar composition 93% MAN/2% HEMA/5% hexyl acrylate was obtained. It exhibits a number-average molecular mass of 50,000 g/mol and a glass transition temperature of 80° C., lower by 40° C. than that of the MANHP homopolymer.

This copolymer was crosslinked via urethane bonds by using HMDI as initiator in the stoichiometric proportion (NCO/OH=1) and dibutyltin dilaurate (5 mol % with respect to the NCO functional groups as catalyst. A network having a level of insolubles of 87% was obtained.

EXAMPLE 11

0.09 mol of methacrylonitrile and 0.01 mol of styrene were used for a radical synthesis under bulk conditions in a sealed tube. A copolymer comprising 17% of styrene units was obtained. This copolymer is soluble in tetrahydrofuran and acetone. It exhibits a molecular mass of 60,000 g/mol.

EXAMPLE 12

Various α,ω-dihydroxyoligo(oxyethylene) having different molar masses were used (Mn=2000, 3400, 4600 and 8000). They are polyethylene glycols which are commercially available under the names PEG2000, PEG3400, PEG4600 and PEG8000.

After dissolving 0.69 g of PEG 4600 (i.e., an amount of OH of $3 \times 10^{-4}$ mol) in 7.5 ml of THF (tetrahydrofuran), sodium hydride is added in the stoichiometric proportion (with respect to the concentration of end OHs). The solution adopts a brown coloring characteristic of the alkoxide formed. The methacrylonitrile is then added to the alkoxide in the proportions appropriate for obtaining the desired length of the MANHP blocks.

The reaction is continued for 24 hours and then it is deactivated with water. From 100 to 300 methacrylonitrile units were thus incorporated (according to the PEG used) with a yield in the vicinity of 100%.

The above procedure was used for the preparation of copolymers form PEG2000, PEG3400 and PEG8000 respectively. For the various syntheses carried out, the concentration in moles of OH/liter was kept constant ($3 \times 10^{-4}$ mol of OH) for 7.5 ml of THF.

The molar masses were determined by proton NMR and they were also measured by GPC (gel permeation chromatography). A comparison of the values obtained is summarized by the following table:

| Starting PEG | Number of MAN units introduced | Mn (GPC) in g/mol | Mn (NMR) in g/mol |
|---|---|---|---|
| PEG2000 | 200 | 13,100 | 15,400 |
| PEG2000 | 100 | 7700 | 7800 |
| PEG3400 | 200 | 10,000 | 15,800 |
| PEG4600 | 200 | 11,400 | 10,400 |
| PEG4600 | 300 | 22,000 | 23,000 |
| PEG8000 | 300 | 16,000 | 28,200 |

Good agreement is observed between the masses obtained by the two types of measurement. The copolymers obtained have a low polydispersity index. The ratio I=Mw/Mn (Mw= mass-average molar mass, Mn=number-average molar mass) is low, less than 1.5. This result is compatible with "living" anionic polymerization (Yield: approximately 100% of polymerization).

Surprisingly, the incorporation of MAN units makes it possible to decrease the crystallinity of the poly(ethylene oxide) (POE) sequence, as is shown by the differential thermal analysis of the samples. Completely amorphous copolymers are thus obtained for 200 methacrylonitrile units incorporated. The copolymer thus obtained exhibits a single glass transition temperature situated between the two glass transition temperatures of the two homopolymers.

A glass transition temperature in the region of −20° C. is obtained for copolymers comprising a POE sequence of 45 units and two side sequences each comprising 100 methacrylonitrile units. The different copolymers synthesized are soluble in many solvents, such as acetone and tetrahydrofuran.

A number of the electrolytes were prepared by incorporating lithium salts in the polymers described above (Examples 1 to 12) and conductivity measurements were carried out.

These measurements are described in the examples hereinbelow.

The polymer is rendered tonically conducting by incorporation of a lithium salt. A lithium salt, such as lithium (trifluoromethanesulfonyl)imide (or LiTFSI) and the polymer are dissolved in acetone. The solution is then cast and the solvent evaporated. Conductivity measurements are carried out with an impedance meter using a cell with a blocking electrode made of stainless steel. Frequency analysis is carried out between 13 MHz and 5 Hz. The measurements are carried out under dynamic vacuum (dry polymer electrolyte) or under a dry argon excess pressure (plasticized polymer electrolytes).

EXAMPLE 13

The conductivity of the MANHP in the dry state as prepared in Example 1 and in the presence of lithium (trifluoromethylsulfonyl)imide (LiTFSI) was measured over a wide range of concentrations.

This electrolyte exhibits a very low conductivity for moderate salt concentrations. The composition of the polymer electrolyte is expressed by the ratio CN/Li, which represents the ratio of the number (CN) of methacrylonitrile units to the number (Li) of moles of salt. A conductivity of $8 \times 10^{-8}$ S/cm at 40° C. is obtained for a ratio CN/Li=8.

Contrary to the phenomenon observed for a poly(oxyethylene), the conductivity of the dry MANHP increases when the concentration of salt increases, that is to say when the CN/Li ratio decreases. For very high concentrations of salt, advantageous conductivities are obtained, such as $5\times10^{-5}$ S/cm for a ratio CN/Li=2. The LiTFSI salt therefore acts surprisingly as an external plasticizer.

| CN/Li | Conductivity σ (S/cm) at 40° C. | Conductivity σ (S/cm) at 80° C. |
|---|---|---|
| 2 | $8 \times 10^{-7}$ | $5 \times 10^{-5}$ |
| 3 | $10^{-8}$ | $3 \times 10^{-6}$ |
| 6 | $10^{-8}$ | $3 \times 10^{-6}$ |
| 8 | $8 \times 10^{-8}$ | $8 \times 10^{-6}$ |
| 12 | $10^{-8}$ | $3 \times 10^{-6}$ |
| 16 | — | $2 \times 10^{-6}$ |
| 30 | — | $10^{-7}$ |

This result, obtained in the absence of solvent, shows a very good interaction between the thermoplastic matrix and the salt, since the latter makes it possible to prepare polymer electrolytes with high concentrations of salt, which is favorable to the conductivities of the plasticized polymer electrolytes.

EXAMPLE 14

30% by mass of methylenebisacrylamide, which is a monomer with a functionality of 4 (sold by the company Aldrich under the reference 14,832-6), 3% by mass of Irgacure I 651, the salt LITFSI and ethylene carbonate (EC), as plasticizer, are added to a solution of MANHP in acetone.

After evaporating the acetone, the film obtained is exposed to UV radiation with the lamp described in Example 2. The propylene carbonate used for the conductivity measurements is only added after the crosslinking, in order to prevent it from being evaporated by infrared heating during the crosslinking.

A conductivity of $10^{-3}$ S/cm at 20° C. is obtained for an electrolyte with the molar composition MANHP (20%)/EC (50%)/PC (25%)/LiTFSI (5%). "MANHP (20%)" means that the proportion of homopolymer MANHP present in the electrolyte is such that the electrolyte comprises 20 mol of MAN units per 50 mol EC, 25 mol of PC and 5 mol of LiTFSI.

Furthermore, an electrolyte with a molar composition MANHP (25%)/EC (70%)/PC (00%)/LiTFSI (5%) was prepared, which electrolyte exhibits an electrical conductivity of $10^{-3}$ S/cm at 20° C. The conductivity remains equal to $7\times10^{-4}$ S/cm at 8° C. and then it rapidly decreases at a lower temperature because of the crystallization of the EC.

Because they only employ one solvent (EC), which is the least volatile, the latter electrolytes are easier to produce but they are restricted to uses at temperatures of greater than 8° C.

Electrochemical stability studies have been carried out on the sample with a molar composition MANHP (20%)/EC (50%)/PC (25%)/LiTFSI (5%). The sample exhibits, by cyclic voltammetery with regard to a stainless steel macroelectrode, good stability towards reduction up to 0 volt with respect to the electrochemical couple Li/Li$^+$ and towards oxidation up to at least 4.1 V (still with respect to the couple Li/Li$^+$. Monitoring the change, over time, in the interfacial resistance between the polymer electrolyte and the lithium metal electrode at 40° C. shows good stability of the interface over several days. This behavior is different from that observed with a conventional electrolyte in which PAN, PC and LiClO$_4$ are combined, which electrolyte shows a continuous increase in the interfacial resistance with time.

| Table giving the ratios $R/R_{to}$ of the interfacial resistances over time. | | |
|---|---|---|
| Time in hours | $R/R_{to}$ Li/(PAN/EC/PC/LiClO$_4$) (1) | $R/R_{to}$ Li/(MANHP/EC/PC/LiTFSI) |
| 0 | 1 | 1 |
| 2 | 1.50 | 1.14 |
| 24 | 3 | 1.14 |
| 50 | 5 | 1.15 |
| 70 | 6 | 1 |
| 80 | 7 | 0.9 |
| 95 | 7.6 | 0.97 |
| 120 | 9 | 1 |
| 130 | 11 | 0.97 |

[1] test for PAN described in: G. B. Appetecchi, F. Croce and B. Scrosati, Electrochemica Acta, 40, 991, 1995

The initial interfacial resistance is $R_{to}$ and the resistance at time t is recorded as R. The change in the ratio $R/R_{to}$ over time shows, to within experimental uncertainty, the stability of the MANHP, whereas the interfacial resistance increases steadily for the PAN-based electrolyte and is found to be multiplied by a factor of more than 10 after 5 days.

EXAMPLE 15

Conductivity measurements were carried out on a copolymer synthesized as described in Example 5 (MAN/HEMA). The copolymer, the salt LiTFSI, the ethylene carbonate, the propylene carbonate and the hexamethylene diisocyanate are dissolved in acetone. The solution is then cast on a substrate and then the acetone is evaporated. The solution is left under an inert atmosphere, in a glove box under argon, for 48 hours at 30° C. in order to bring the crosslinking to completion.

The molar composition chosen for the conductivity measurements is as follows:

MAN/HEMA (15%)/EC (56%)/PC (23%)/LiTFSI (5%) copolymer.

100 mol of such a material comprise 56 mol of EC, 23 mol of PC, 5 mol of LiTFSI, 97/100×15=14.55 mol of MAN units and 3/100×15=0.45 mol of HEMA units.

The polymer electrolyte prepared exhibits a conductivity of $8\times10^{-4}$ S/cm at 20° C. and $4\times10^{-4}$ at 0° C.

EXAMPLE 16

Conductivity measurements were carried out on a terpolymer synthesized as described in Example 10. The copolymer, the salt LiTFSI, the ethylene carbonate, the propylene carbonate and the hexamethylene diisocyanate are dissolved in acetone. The solution is then cast on a substrate and then the acetone is evaporated. The solution is left for 48 hours in order to bring the crosslinking to completion. The molar composition used for the conductivity measurements is as follows:

MAN/HEMA/HA (15%)/EC (56%)/PC (23%)/LiTFSI (5%) copolymer.

100 mol of such a material comprise 56 mol of EC, 24 mol of PC, 5 mol of LiTFSI, 93/100×15=13.95 mol of MAN units, 2/100×15=0.3 mol of HEMA units 4 and 0.75 mol HA (hexyl acrylate) units.

The conductivity is tested at $10^{-3}$ S/cm at 20° C. and $5\times10^{-4}$ S/cm at 0° C.

EXAMPLE 17

Conductivity measurements were carried out on a copolymer synthesized as described in Example 12. This copolymer comprises a POE sequence with 45 units and two side sequences each comprising 100 methacrylonitrile units. The copolymer is dissolved in acetone in the presence of the lithium salt (LiTFSI). The film is cast and the solvent is then evaporated. The polymer film is left to dry for several days. In this type of copolymer, the POE block and the MANHP block can contribute to solvating the $Li^+$ cation. The composition of the electrolyte is therefore expressed as (O+CN)/Li, the ratio of, on the one hand, the sum of the number of moles of oxyethylene units (O) and of the number of moles of MAN (CN) to, on the other hand, the number of moles of lithium salt (Li).

The dry electrolyte obtained exhibits a conductivity of $10^{-6}$ S/cm at approximately 25° C. for a concentration of salt (O+CN)/Li=8. If the concentration of salt in the electrolyte is increased to the ratio (O+CN)/Li=1, the conductivity increases to $2\times10^{-5}$ S/cm at 20° C. This value is equivalent to those which are obtained with the best amorphous polyethers.

The salt LiTFSI therefore acts here as external plasticizer. This surprising phenomenon is contrary to that commonly observed for polyethers (POE), where the salt increases the Tg as a result of the strong salt-matrix interactions.

EXAMPLE 18

Polymethacrylonitrile-co-poly(hydroxyethyl methacrylate) bipolymers were prepared by bulk radical copolymerization at 80° C. of methacrylonitrile (MAN) and hydroxyethyl methacrylate (HEMA).

6 ml of MAN, 10 microliters of a 0.1 g/ml solution of AIBN in acetone (i.e. 1 mg) and 0.260 ml of HEMA were used. The reaction mixture was cooled after reacting for 48 hours, dissolved in acetone and then precipitated from pentane. The recovered precipitate was washed with pentane and then dried under vacuum at 50° C.

The process was repeated under the same conditions, using successively 6 ml of MAN and 0.434 ml of HEMA and then 6 ml of MAN and 0.867 ml of HEMA.

The crosslinking of the copolymers obtained makes it possible to improve their mechanical behavior and to minimize creep problems. The copolymers were crosslinked using hexamethylene diisocyanate (HMDI). The crosslinking results from the polycondensation between the OH functional groups of the copolymer and the isocyanate functional groups of HMDI, which form urethane bonds. A solution was prepared by introducing an MAN/HEMA copolymer and HMDI into acetone in stoichiometric proportions (NCO/OH=1) in the presence of dibutyltin dilaurate (5% with respect to the OH functional groups) as catalyst. After degassing in order to remove air bubbles, the solution was cast into a substrate, the solvent was evaporated and the reaction was allowed to continue for 48 hours at 30° C. in a glove box maintained under dry argon.

The composition of each of the copolymers before crosslinking was determined by proton NMR. The glass transition temperature of each of the copolymers Ibefore and after crosslinking was determined. The results are collated in the table hereinbelow. "MAN/HEMA" represents the initial percentage in moles of the monomers used. "MAN/HEMA (NMR)" denotes the composition of the copolymer, as % of units, determined by NMR, "Tg(C)" denotes the glass transition temperature in degrees Celsius of the copolymers obtained and "Tg(CL)" denotes the transition temperature of the networks obtained by crosslinking the copolymers.

| MAN/HEMA | MAN/HEMA (NMR) | Tg(C) | Tg(CL) |
|---|---|---|---|
| 97/3 | 94.2/5.8 | 92.8 | 49.2 |
| 95/5 | 93/7 | 78.8 | 45.7 |
| 90/10 | 82.6/17.4 | 95.8 | 41.1 |

It is found that the Tg of a network is markedly less than the Tg of the corresponding copolymer.

Conductivity measurements were carried out on the three copolymers synthesized. For each of the copolymers, a solution of copolymer in acetone was prepared and then the salt LiTFSI, the ethylene carbonate, the propylene carbonate and the HMDI were added in proportions such that the final membrane exhibits the following composition: 11% of crosslinked copolymer, 73 of EP/PC (1/1) and 16% of salt LiTFSI. The solution was cast in a glass ring with a teflon-coated base and then the acetone was evaporated. After having maintained the unit at ambient temperature for 48 hours, it was found that 90% of the copolymer had crosslinked.

The change in the conductivity as a function of the temperature was measured. The curve representing "log (conductivity)"=f(1/temperature in K) shows excellent behavior in a temperature range from 253 K to 363 K. The membrane undergoes neither detrimental change nor creep at high temperature, despite the high levels of solvents used. The conductivity, expressed in millisiemens/cm, reaches 0.7, 3.5 and 9 respectively at the temperatures of −20° C., +20° C. and +90° C.

The membrane prepared from the 95/5 bipolymer was studied by cyclic voltammetery at 25° C. using a stainless steel working electrode, a secondary electrode and a lithium reference electrode. The voltammogram obtained shows good stability in the range 0 to 4.4 volts with respect to lithium. The reoxidation/deposition of lithium efficiency is 75% under these conditions.

EXAMPLE 19

Polymethacrylonitrile-co-hydroxyethyl methacrylate-co-butyl methacrylate (MAN/HEMA/BUMA) terpolymers were prepared according to the procedure described in Example 18. 6 ml of MAN, 10 microliters of a 0.1 g/l solution of AIBN in acetone, i.e. 1 mg of AIBN, 0.26 ml of HEMA and 0.569 ml of BUMA were used. The reaction mixture was cooled after reacting for 48 hours, dissolved in acetone and then precipitated from pentane. The precipitate recovered was washed with pentane and then dried under vacuum at 50° C.

The process was repeated under the same conditions using successively 6 ml of MAN, 0.26 ml and 1.137 ml of HEMA and of BUMA and then 6 ml of MAN, 0.26 ml and 2.275 ml of HEMA and of BUMA.

The composition of the terpolymers was determined by proton NMR on samples dissolved in deuterated D6-acetone. A solution of the terpolymers in THF was subjected to analysis by gel permeation chromatography using a set of ultrastyragel columns with porosities of 500, $10^3$, $10^4$ and $10^5$ angstroms. The average masses Mw and Mn were calculated in polystyrene equivalents.

It is apparent that the monomer BUMA exerts an internal plasticizing effect on the non-crosslinked terpolymer, since the Tg values decrease when the level of BUMA increases.

The copolymers were crosslinked using HMDI under conditions similar to those described in Example 18. It is found that crosslinking by HMDI exerts a greater plasticizing effect than incorporation of BUMA.

The results are collated in the table hereinbelow. "MAN/HEMA/BUMA" represents the initial percentage in moles of the monomers used. "MAN/HEMA/BUMA (NMR)" denotes the composition of the copolymer, as % of units, determined by NMR, "Tg C)" denotes the glass transition temperature in ° C. of the copolymers obtained and "Tg (CL)" denotes the transition temperature of the networks obtained by crosslinking the copolymers.

| MAN/ REMA/ BUMA | HEMA/ BUMA [lacuna] | Mn g/mol | Mw g/mol | I = Mw/Mn | Tg (C) | Tg (CL) |
| --- | --- | --- | --- | --- | --- | --- |
| 92/3/5 | 87.2/5.5/7.3 | 74,800 | 89,000 | 1.2 | 98.4 | 57.7 |
| 87/3/10 | 78.8/8/13.2 | 129,900 | 88,900 | 1.45 | 90.8 | 63.5 |
| 77/3/20 | 72/6.4/21.6 | 307,900 | 599,300 | 1.9 | 80.4 | 66.7 |

Membranes were prepared under conditions analogous to those described in Example 18 and their conductivity was measured. The membrane obtained from a composition comprising 73 mol % of a 1/1 EC/PC mixture, 11 mol % of network obtained from the mixture of monomers 92/3/5 and 16 mol % of $LiN(SO_2CF_3)_2$ exhibits the best conductivity (2,3 millisiemens at 20° C.). A transport number for the lithium of 0.79 was determined at 25° C.

EXAMPLE 20

Terpolymers in which MAN and HEMA are combined with a methacrylic monomer with a pendant oligoether chain were prepared under the same conditions as those of Example 19, the butyl methacrylate being replaced by a poly(ethylene glycol) ethyl ether methacrylate with a molar mass of 246 sold by the company Aldrich under the reference 40,954-5.

6 ml of MAN, 10 microliters of a 0.1 g/l w solution of AIBN in acetone (i.e. 1 mg of AIBN), 0.17 ml of HEMA and 0.46 ml of PEGEEM were used. The reaction mixture was cooled after reacting for 48 hours, dissolved in acetone and then precipitated from pentane. The precipitate recovered was washed with pentane and then dried under vacuum at 50° C. The process was repeated under the same conditions using successively 6 ml of MAN, 0.17 ml and 0.69 ml of HEMA and of PEGEEM and then 6 ml of MAN, 0.17 ml and 0.91 ml of HEMA and of PEGEEM.

The average molar masses and the glass transition temperatures were determined. The results are collated in the table hereinbelow.

The results are collated in the table hereunder. "MAN/HEMA/PEGEEM" represents the starting percentage in moles of the monomers used. "MAN/HEMA/PEGEEM (NMR)" denotes the composition of the copolymer, as % of units, determined by NMR, "Tg(C)" denotes the glass transition temperature in 0° C. of the copolymers obtained and "Tg(CL)" denotes the transition temperature of the networks obtained by crosslinking the copolymers.

| MAN/ HEMA/ PE-GEEM | MAN/ HEMA/ PEGEEM [lacuna] | Mn g/mol | Mw g/mol | I = Mw/Mn | Tg (C) | Tg (CL) |
| --- | --- | --- | --- | --- | --- | --- |
| 93.5/ 2.8/ 3.7 | 90.2/5.1/4.7 | 45,200 | 184,000 | 4.1 | 77.8 | 56.5 |
| 91.6/ 2.8/ 5.6 | 85.6/9.4/5 | 38,000 | 152,000 | 3.99 | 67.7 | 49.5 |

The conductivities at 20° C. vary between 2.5 and 3.1 millisiemens/cm according to the composition of the copolymer. A transport number for the lithium of 0.57 was measured for the terpolymer with the MAN/HEMA/PEGEEM composition of 85.6/9.4/5.

What is claimed is:

1. Solid polymer electrolyte comprising a polymer and a metal salt wherein the salt is optionally attached to the polymer, said polymer comprising at least one methacrylonitrile polymer chosen from:

three-dimensional copolymers of methacrylonitrile and at least one acrylic or methacrylic comonomer, wherein at least one of said acrylic or methacrylic comonomer is a crosslinkable comonomer selected from glycidyl acrylate or glycidyl methacrylate.

2. Solid polymer electrolyte according to claim 1, wherein the methacrylonitrile polymer is a copolymer of methacrylonitrile, a crosslinkable acrylic or methacrylic comonomer selected from glycidyl acrylate or glycidyl methacrylate and an acrylic or methacrylic comonomer providing internal plasticization of the polymer by decreasing its glass transition temperature.

3. Solid polymer electrolyte according to claim 2, wherein the acrylic or methacrylic comonomer providing internal plasticization corresponds to the formula CHX=CZ—CO—V—Y, in which:

X represents $C_nH_{2n+1}$, with $0 \leq n \leq 8$;

Z represents $C_nH_{2n+1}$, with $0 \leq n \leq 8$, or $(CH_2)_mCN$, with $0 \leq m \leq 4$;

V represents O, NH or NR, R represents $C_nH_{2n+1}$, with $0 \leq n \leq 8$;

Y represents a $C_nH_{2n+1}$ radical, with $0 \leq n \leq 8$, a radical carrying an oxirane group $C_nH_{2n}$—(CH—CH$_2$)—O, with $1 \leq n \leq 4$, or a radical $[(CH_2)_m$—O—$]_pR'$, in which m=2, 3 or 4, $1 \leq p \leq 50$ and R' represents $C_nH_{2n+1}$, with $0 \leq n \leq 8$.

4. Solid polymer electrolyte according to claim 1, wherein the methacrylonitrile polymer is a copolymer of methacrylonitrile, a crosslinkable acrylic or methacrylic comonomer selected from glycidyl acrylate or glycidyl methacrylate and a comonomer which has an ionic functional group in order to obtain a unipolar electrolyte.

5. Solid polymer electrolyte according to claim 4, wherein the said comonomer carries an ionic functional group selected from the group consisting of carboxylate, phosphate, phosphonate, sulfonate and perfluorosulfonate.

6. Solid polymer electrolyte according to claim 1, wherein said salt comprises at least one lithium salt chosen from the group consisting of lithium halides, lithium perfluorosulfonate, lithium (trifluoromethylsulfonyl)imide, lithium bis(trifluoromethyl-sulfonyl)methide, lithium tris(trifluoromethylsulfonyl)methide, lithium perchlorate, lithium hexafluoroarsenate, lithium hexafluorophosphate, lithium hexafluoroantimonate and lithium tetrafluoroborate.

7. Solid polymer electrolyte according to claim 6, wherein said lithium halides are of the formula LiX where X=Cl, Br, I or $I_3$.

8. Solid polymer electrolyte according to claim 1, which additionally comprises at least one solvent chosen from propylene carbonate (PC), ethylene carbonate (EC), γ-butyrolactone, dimethoxyethane or dialkyl carbonates.

9. Solid polymer electrolyte according to claim 2, wherein the comonomer providing internal plasticization comprises butyl acrylate.

10. Solid polymer electrolyte according to claim 3, wherein the methacrylonitrile polymer is a copolymer of methacrylonitrile, a crosslinkable acrylic comonomer selected from glycidyl acrylate or glycidyl methacrylate and at least one acrylic comonomer corresponding to the formula CHX=CZ—CO—V—Y in which X=H, Z=CH$_3$, V=O and Y=$[(CH_2)_m$—O$]_pR'$, winth m=2, R'=H or CH$_3$ and $1 \leq p \leq 22$.

* * * * *